(12) United States Patent
Schooley

(10) Patent No.: US 12,299,127 B2
(45) Date of Patent: May 13, 2025

(54) METHODS AND APPARATUS TO MITIGATE FIRMWARE MALWARE

(71) Applicant: Musarubra US LLC, San Jose, CA (US)

(72) Inventor: Timothy James Schooley, Cracow (PL)

(73) Assignee: MUSARUBRA US LLC, San Jose, CA (US)

( * ) Notice: Subject to any disclaimer, the term of this patent is extended or adjusted under 35 U.S.C. 154(b) by 282 days.

(21) Appl. No.: 17/894,797

(22) Filed: Aug. 24, 2022

(65) Prior Publication Data
US 2024/0070274 A1 Feb. 29, 2024

(51) Int. Cl.
| | |
|---|---|
| G06F 21/56 | (2013.01) |
| G06F 21/55 | (2013.01) |
| G06F 21/57 | (2013.01) |

(52) U.S. Cl.
CPC .......... *G06F 21/566* (2013.01); *G06F 21/554* (2013.01); *G06F 21/572* (2013.01); *G06F 21/575* (2013.01); *G06F 2221/034* (2013.01)

(58) Field of Classification Search
CPC .... G06F 21/566; G06F 21/554; G06F 21/572; G06F 21/575; G06F 2221/034; G06F 21/56; G06F 21/568
See application file for complete search history.

(56) References Cited

U.S. PATENT DOCUMENTS

| | | | | |
|---|---|---|---|---|
| 5,274,819 A | * | 12/1993 | Blomfield-Brown | ........................ G06F 9/445 718/100 |
| 8,479,292 B1 | * | 7/2013 | Linhardt | ............. H04L 63/1441 713/1 |
| 8,806,638 B1 | * | 8/2014 | Mani | .................... H04L 63/1441 726/4 |
| 10,075,847 B1 | * | 9/2018 | Moreton | ............. H04L 63/0861 |
| 11,663,328 B2 | * | 5/2023 | Hahn | .................. G06F 12/0246 726/5 |
| 2002/0116542 A1 | * | 8/2002 | Tarbotton | ............... G06F 21/564 714/38.14 |
| 2003/0033396 A1 | * | 2/2003 | McCall | ................... H04L 67/12 709/223 |
| 2005/0216759 A1 | * | 9/2005 | Rothman | ............ H04L 63/1408 726/22 |
| 2006/0288405 A1 | * | 12/2006 | Albisu | ................ H04L 63/0838 726/8 |
| 2009/0070873 A1 | * | 3/2009 | McAfee | .................. G06F 21/56 726/22 |
| 2009/0282483 A1 | * | 11/2009 | Bennett | ............... H04L 63/1416 726/23 |
| 2011/0209220 A1 | * | 8/2011 | Tikkanen | ................ G06F 21/56 726/23 |

(Continued)

*Primary Examiner* — Ramy M Osman
(74) *Attorney, Agent, or Firm* — HANLEY, FLIGHT & ZIMMERMAN, LLC

(57) ABSTRACT

Example methods and apparatus are disclosed herein to mitigate firmware malware, an example apparatus comprising at least one memory; instructions; and at least one processor to execute the instructions to cause the at least one processor to at least: detect presence of firmware malware, the firmware malware to be executed prior to booting of an operating system of a computing device; attempt remediation of the firmware malware; and in response to a failure to remediate the firmware malware, cause display of a notification of the presence of the firmware malware.

17 Claims, 7 Drawing Sheets

(56) References Cited

U.S. PATENT DOCUMENTS

| | | | | |
|---|---|---|---|---|
| 2012/0159041 A1* | 6/2012 | Saxena | .................... | G06F 21/78 |
| | | | | 711/163 |
| 2013/0276113 A1* | 10/2013 | Dalcher | .................. | G06F 11/00 |
| | | | | 726/23 |
| 2015/0264047 A1* | 9/2015 | Roy | .................... | H04L 63/0869 |
| | | | | 726/4 |
| 2019/0371105 A1* | 12/2019 | Ye | .......................... | H04L 63/068 |
| 2022/0014509 A1* | 1/2022 | Walters | .................... | H04L 63/20 |
| 2024/0070274 A1* | 2/2024 | Schooley | ................ | G06F 21/56 |

\* cited by examiner

WARNING:

THIS SYSTEM IS LOCKED BECAUSE A VIRUS HAS BEEN DETECTED IN THE FIRMWARE THAT COULD LEAD TO DATA LOSS OR THEFT. PLEASE CONTACT YOUR IT HELPDESK FOR FURTHER ASSISTANCE.

WARNING:

YOUR SYSTEM HAS BEEN LOCKED DUE TO SUSPECTED DETECTION OF MALWARE. IF YOU HAVE CONTACTED YOUR IT HELPDESK AND GIVEN AN OVERRIDE CODE, PLEASE ENTER THE CODE BELOW:

<ENTER CODE HERE>   CONTINUE

FIG. 4

METHODS AND APPARATUS TO MITIGATE FIRMWARE MALWARE

FIELD OF THE DISCLOSURE

This disclosure relates generally to malware prevention and, more particularly, to methods and apparatus to mitigate firmware malware.

BACKGROUND

In recent years, malware and other threats to computer security have evolved. Detecting and mitigating new malware helps computer security entities improve data security and system security for clients. In addition, detecting and mitigating malware can prevent negative consequences including system compromise, loss of resources, etc. for a computer security entity and/or their clients. To detect and mitigate malware, computer security entities must be aware of threats to computing devices and find solutions to mitigate these threats. In some examples, a computer security entity may create solutions to be implemented on client devices.

BRIEF DESCRIPTION OF THE DRAWINGS

FIG. 3 is an example user interface illustrating a prompt to be displayed when an example computing device has been locked due to detection of firmware malware.

FIG. 4 is an example user interface illustrating a prompt to be displayed when an example computing device has been locked due to detection of firmware malware.

Figure 1:
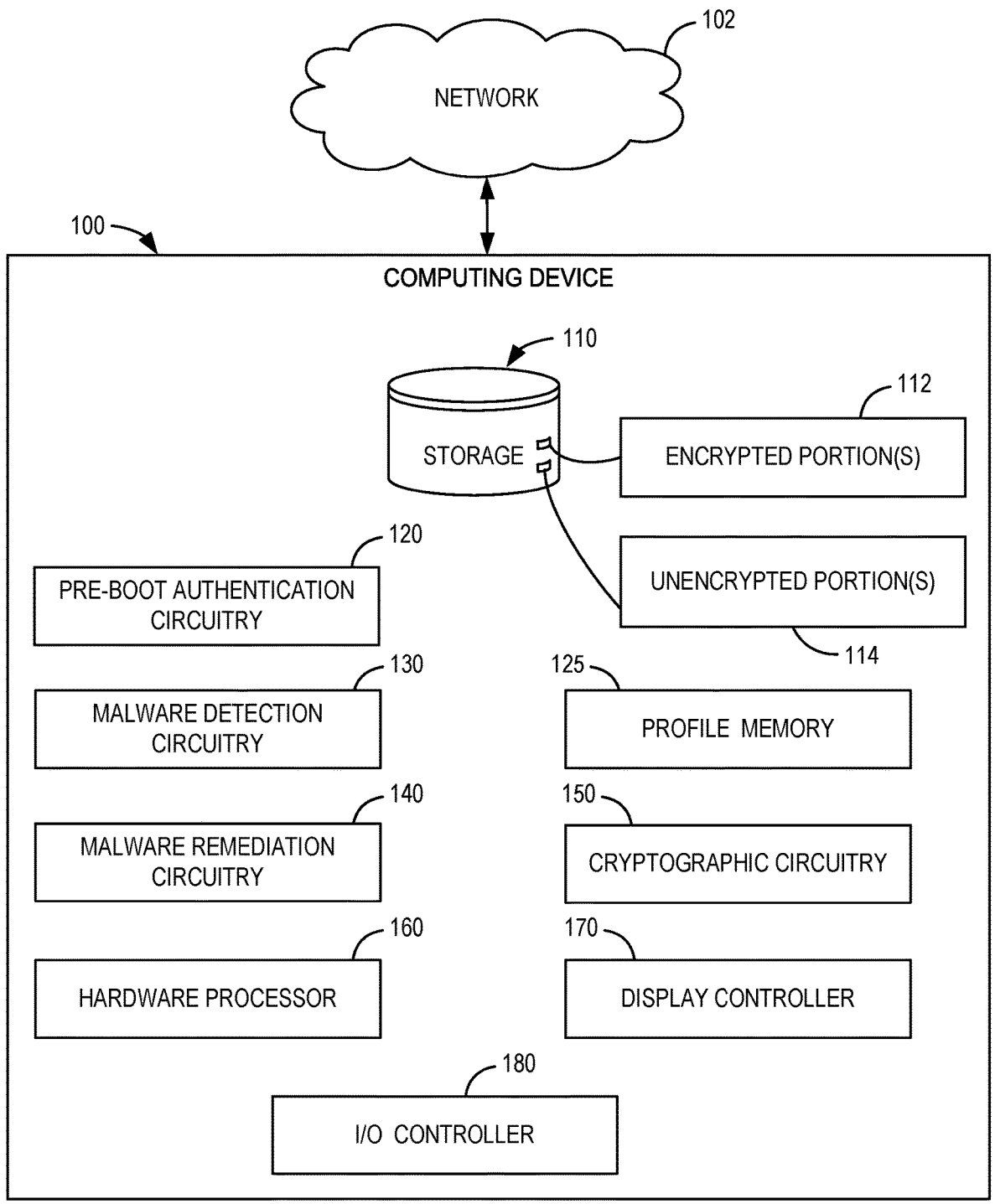
FIG. 1 is a block diagram of an example computing device implemented according to teachings of this disclosure to mitigate firmware malware.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing device including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

With the continued discovery of new computer threats, including malware, malware detection and remediation has become especially important for protecting users of computing devices. This includes all users of computing devices, including for personal use, professional use, etc. Computer security entities seek to detect and mitigate new malware and computer threats. Detecting malware allows computer security entities to, for example, identify problems and patterns that may expose vulnerabilities in computers. Additionally, such information allows computer security entities to detect malware on a user device and attempt to remediate the malware. As used herein, malware refers to any component, especially software, designed to disrupt, damage, or gain unauthorized access to a computer system. As used herein, malware detection includes identifying the presence and nature of malware on a computing device, and malware remediation includes removing, disabling, or otherwise rendering ineffective malware on a computing device.

In recent years, malware that attacks firmware of computers is becoming more prominent. As used herein, firmware is a class of computer software which is responsible for the control of the hardware of a computing device. This type of malware can involve the Unified Extensible Firmware Interface (UEFI), which is a specification that connects the firmware of a computing device to its operating system (OS). An example of firmware malware is malware affecting the UEFI. Firmware malware can include spyware or any other type of malware which, in some examples, can result in security risks and system compromise. Firmware malware can remain active even after taking certain preventative measures including, for example, reinstalling the operating system of the example computing device, presenting a serious threat to users and data.

Current malware detection methods suffer from several problems which reduce their effectiveness in detecting and remediating firmware malware on computing devices. In many cases, the UEFI of an example computing device begins running before or during the computing device bootup process. Therefore, it could be useful to detect firmware malware before the booting of an example operating system to prevent the firmware malware from harming a computing device, in some examples resulting in system compromise. Additionally, in response to detecting firmware malware, it could be useful to attempt to remediate the detected firmware malware before initiating the computing device bootup process, and, in response to a failure to remediate the detected firmware malware on a computing device, require a user of a computing device to seek additional support, for example from IT support, before attempting to initiate the computing device bootup process.

FIG. 1 is a block diagram of an example environment including an example computing device 100 implemented in accordance with the teachings of this disclosure to detect and/or remediate firmware malware. In the illustrated example, the example computing device 100 communicates with an example network 102. In the illustrated example, the example computing device 100 includes example storage 110, including example encrypted portion(s) 112 and example unencrypted portion(s) 114. The computing device 100 further includes example pre-boot authentication circuitry 120, example profile memory 125, example malware detection circuitry 130, example malware remediation circuitry 140, example cryptographic circuitry 150, an example hardware processor 160, an example display controller 170, and an example I/O controller 180.

The example network 102 represents interconnected computers and/or devices that, in some examples, share resources and using common network protocols. The example network 102 may be, in some examples, monitored, maintained, or operated by an example computer security entity responsible for managing operating of the computing device 100 including, for example, detecting malware and/or mitigating the same. The example network 102 may include storage resources.

The example storage 110 of the example computing device 100 of FIG. 1 is implemented by any memory, storage device, and/or storage disc for storing data such as flash memory, magnetic media, optical media, etc. Furthermore, the data stored in the example storage 110 can be in any data format such as binary data, comma delimited data, tab delimited data, structured query language (SQL) structures, etc. While in the illustrated example the example storage 110 is illustrated as a single element, the example storage 110 and/or any other data storage elements described herein may be implemented by any number and/or type(s) of memories. In the illustrated example computing device 100 of FIG. 1, the example storage 110 can store any type of data for use by the example computing device 100 including, for example, data files, operating system files, configuration files, executables, etc.

The example storage 110 may include any one of example encrypted portion(s) 112 and/or example unencrypted portion(s) 114. The example encrypted portion(s) 112 and/or example unencrypted portion(s) 114 may be one or more portions comprising the example storage 110. The example encrypted portion(s) 112 may include storage that is encrypted as, for example, a cipher text, so that only an authorized party, for example the example computing device 100, may decrypt the information and access or edit the data. The example unencrypted portion(s) 114 may include, for example, storage that is not encrypted, for example, in plaintext, so that any party receiving a transmission of data originating from the unencrypted portions may read the information in the example unencrypted portion(s) 114.

The example storage 110 including encrypted portion(s) 112 may include system software to manage hardware and software resources of the example computing device 100. The system software to manage hardware and software resources of the example computing device 100 may be an operating system. The operating system includes at least a partition of the example encrypted portion(s) 112 containing a bootloader. As used herein, a bootloader is an executable computer program responsible for the bootup process of a computing device, including, in some examples, the example computing device 100.

The example pre-boot authentication circuitry 120 allows pre-boot authentication. In some examples, the example pre-boot authentication circuitry 120 does not allow pre-boot authentication if malware has been detected on the example computing device 100. In some examples, the pre-boot authentication is allowed if such malware can be mitigated. In some examples, the example pre-boot authentication circuitry 120 allows pre-boot authentication before storage 110, including encrypted portion(s) 112, can be accessed and/or read by, for example, a processor executing instructions. In some examples, the example system software to manage hardware and software resources of the example computing device 100, as described above and containing a bootloader, cannot be read without prior authentication from the example pre-boot authentication circuitry 120.

In some examples, the computing device 100 includes means for allowing pre-boot authentication. For example, the means for allowing pre-boot authentication may be implemented by the example pre-boot authentication circuitry 120. In some examples, the pre-boot authentication circuitry 120 may be instantiated by processor circuitry such as the example processor circuitry 512 of FIG. 5. For instance, the pre-boot authentication circuitry 120 may be instantiated by the example microprocessor 600 of FIG. 6 executing machine executable instructions such as those implemented by at least blocks 210, 240, 250, and 254 of FIG. 2. In some examples, the pre-boot authentication circuitry 120 may be instantiated by hardware logic circuitry, which may be implemented by an ASIC, XPU, or the FPGA circuitry 700 of FIG. 7 structured to perform operations corresponding to the machine readable instructions. Additionally or alternatively, the pre-boot authentication circuitry 120 may be instantiated by any other combination of hardware, software, and/or firmware. For example, the pre-boot authentication circuitry 120 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example profile memory 125 is an example computer memory configured to store data on an example computing device 100. In some examples, the example profile memory 125 may store data items to be used in some examples of this invention.

The example malware detection circuitry 130 detects malware in accordance with the examples disclosed herein. The example malware detection circuitry 130 performs malware scans of the example computing device 100 to detect malware present on the computing device 100. In certain examples, the malware detection circuitry 130 scans for malware impacting the firmware of the example computing device 100. By way of example, the example malware detection 130 may perform scans to search for malicious loaded drivers, detection of runtime services hooking, firmware image analysis, or EFI system partition (ESP) file analysis. In some examples, the results of a scan may allow the example malware detection circuitry 130 to determine whether the example computing device 100 is free of any detected malware, and can trigger further action with respect to the example computing device 100. In some examples, the example malware detection circuitry 130 may send or receive signatures corresponding to detected malware with, as an example, a server that provides such malware signatures (e.g., via the network 102). In some examples, the example malware detection circuitry 130 may perform tamper-detection and/or other integrity checks to attempt to ensure the effectiveness of the malware detection. In some examples, the malware detection circuitry 130 may receive malware signatures in advance of a malware scan in a form that can be validated (e.g., a signed binary, etc.). In some examples, the server provides information to the example malware detection circuitry 130 regarding the nature of the malware, including any information about the malware or any example methods and apparatus designed to mitigate the malware.

In some examples, the computing device 100 includes means for detecting malware. For example, the means for detecting malware may be implemented by the example malware detection circuitry 130. In some examples, the malware detection circuitry 130 may be instantiated by processor circuitry such as the example processor circuitry 512 of FIG. 5. For instance, the malware detection circuitry 130 may be instantiated by the example microprocessor 600 of FIG. 6 executing machine executable instructions such as those implemented by at least blocks 220 and 230 of FIG. 2. In some examples, the malware detection circuitry 130 may be instantiated by hardware logic circuitry, which may be implemented by an ASIC, XPU, or the FPGA circuitry 700 of FIG. 7 structured to perform operations corresponding to the machine readable instructions. Additionally or alternatively, the malware detection circuitry 130 may be instantiated by any other combination of hardware, software, and/or firmware. For example, the malware detection circuitry 130 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example malware remediation circuitry 140 attempts to remediate malware detected on the example computing device 100. In some examples, the example malware remediation circuitry 140 may, upon detection of malware by the example malware detection circuitry 130, attempt to contain the malware and/or assess the nature of the malware. In some examples, the example malware remediation circuitry 140 may attempt to remove all instances of malware from the example computing device 100 and ensure the removal of the malware from the example computing device 100.

In some examples, the computing device 100 includes means for attempting to remediate malware detected on the example computing device 100. For example, the means for attempting to remediate malware detected on the example computing device 100 may be implemented by the example malware remediation circuitry 140. In some examples, the malware remediation circuitry 140 may be instantiated by processor circuitry such as the example processor circuitry 512 of FIG. 5. For instance, the malware remediation circuitry 140 may be instantiated by the example microprocessor 600 of FIG. 6 executing machine executable instructions such as those implemented by at least blocks 245 and 262 of FIG. 2. In some examples, the malware remediation circuitry 140 may be instantiated by hardware logic circuitry, which may be implemented by an ASIC, XPU, or the FPGA circuitry 700 of FIG. 7 structured to perform operations corresponding to the machine readable instructions. Additionally or alternatively, the malware remediation circuitry 140 may be instantiated by any other combination of hardware, software, and/or firmware. For example, the malware remediation circuitry 140 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example cryptographic circuitry 150 of the example computing device 100 encrypts and/or decrypts a disk and/or storage components of the example computing device 100. In some examples, the example cryptographic circuitry 150 of the example computing device 100 is responsible for encryption of a disk associated with the example computing device 100 in association with preventing pre-boot authentication. In some examples the example cryptographic circuitry 150 may be responsible for decryption of at least some of the encrypted portion(s) 112 of the example storage 110 including a volume comprising an operating system.

In some examples, the computing device 100 includes means for encrypting and/or decrypting a disk and/or storage components of the example computing device 100 (i.e., cryptographic means). For example, the means for encrypting and/or decrypting a disk and/or storage components of the example computing device 100 may be implemented by the example cryptographic circuitry 150. In some examples, the cryptographic circuitry 150 may be instantiated by processor circuitry such as the example processor circuitry 512 of FIG. 5. For instance, the cryptographic circuitry 150 may be instantiated by the example microprocessor 600 of FIG. 6 executing machine executable instructions such as those implemented by at least block 252 of FIG. 2. In some examples, cryptographic circuitry 150 may be instantiated by hardware logic circuitry, which may be implemented by an ASIC, XPU, or the FPGA circuitry 700 of FIG. 7 structured to perform operations corresponding to the machine readable instructions. Additionally or alternatively, the cryptographic circuitry 150 may be instantiated by any other combination of hardware, software, and/or firmware. For example, the cryptographic circuitry 150 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example hardware processor 160 executes example machine readable instructions in accordance with this invention. The example hardware processor 160 is implemented by one or more analog or digital circuit(s), logic circuits, programmable processor(s), application specific integrated circuit(s) (ASIC(s)), programmable logic device(s) (PLD(s)), and/or field programmable logic device(s) (FPLD(s)), etc.

The example display controller 170 controls the output display of the example computing device 100. In some examples, the example display controller 170 causes presentation of a user interface on the output display of the example computing device 100 alerting a user to the presence of firmware malware detected by the malware detection circuitry 130 in accordance with the invention. In some examples, the example display controller 170 causes presentation of a user interface on the output display of the example computing device 100 displaying an option allowing a user to provide an override instruction to allow pre-boot authentication to take place. In some examples, the override instruction includes a button press representing an instruction of the user to proceed with booting. In some other examples, the override instruction includes receipt of an override code that is validated before proceeding with booting. In other examples, the example display controller 170 causes presentation of a user interface on the output display of the example computing device 100 relevant to any of the examples of this disclosure.

In some examples, the computing device 100 includes means for controlling the output display of the example computing device 100. For example, the means for controlling the output display of the example computing device 100 may be implemented by the display controller 170. In some examples, the display controller 170 may be instantiated by processor circuitry such as the example processor circuitry 512 of FIG. 5. For instance, the display controller 170 may be instantiated by the example microprocessor 600 of FIG. 6 executing machine executable instructions such as those implemented by at least blocks 260 and 264 of FIG. 2. In some examples, the display controller 170 may be instantiated by hardware logic circuitry, which may be implemented by an ASIC, XPU, or the FPGA circuitry 700 of FIG. 7 structured to perform operations corresponding to the machine readable instructions. Additionally or alternatively, the display controller 170 may be instantiated by any other combination of hardware, software, and/or firmware. For example, the display controller 170 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example I/O controller 180 controls the input and output to and from the example computing device 100. The example I/O controller 180 may control the connected input and output devices to the example computing device 100. In some examples, the example I/O controller 180 may manage input devices to the example computing device 100 including, for example, an audio sensor, a microphone, a camera (still or video), a keyboard, a button, a mouse, a touchscreen, a trackpad, a trackball, isopoint, and/or a voice recognition system. In some examples, the example I/O controller 180 may manage output devices of the example computing device 100 including, for example, display devices (e.g., a light emitting diode (LED), an organic light emitting diode (OLED), a liquid crystal display, a cathode ray tube display (CRT), a touchscreen, a tactile output device, a printer and/or speakers).

Figure 2:
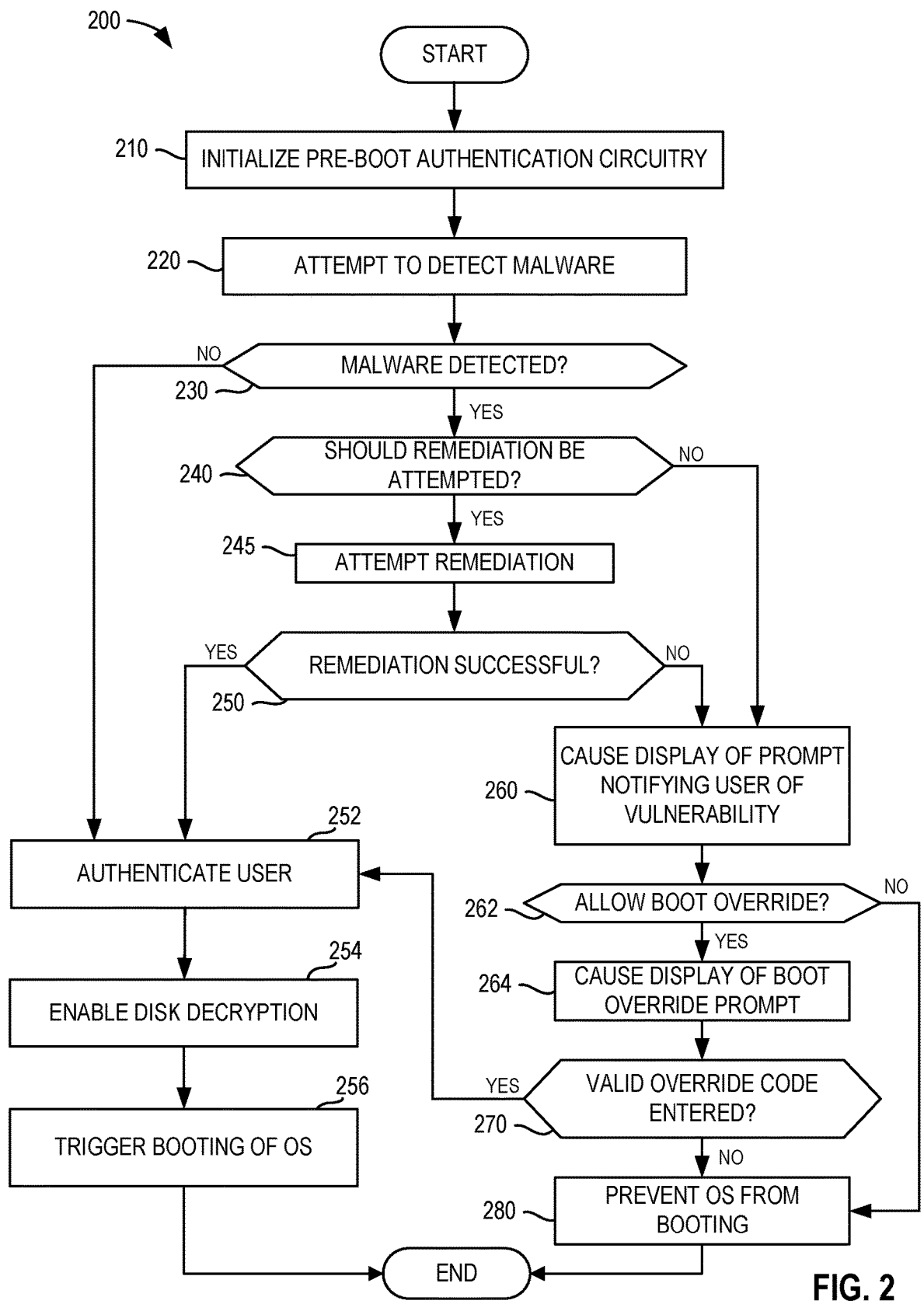
FIG. 2 is a flowchart representative of machine readable instructions which may be executed to implement the example computing device of FIG. 1 to mitigate firmware malware.

While an example manner of mitigating firmware malware on the example computing device 100 of FIG. 1 is illustrated in FIG. 2, one or more of the elements, processes, and/or devices illustrated in FIG. 2 may be combined, divided, re-arranged, omitted, eliminated, and/or implemented in any other way. Further, the example pre-boot authentication circuitry 120, the example profile memory 125, the example malware detection circuitry 130, the example malware remediation circuitry 140, the example cryptographic circuitry 150, the example hardware processor 160, the example display controller 170, and/or the example I/O controller 180, and/or, more generally, the example computing device 100 of FIG. 1, may be implemented by hardware alone or by hardware in combination with software and/or firmware. Thus, for example, any of the example pre-boot authentication circuitry 120, the example profile memory 125, the example malware detection circuitry 130, the example malware remediation circuitry 140, the example cryptographic circuitry 150, the example hardware processor 160, the example display controller 170, the example I/O controller 180, and/or, more generally, the example computing device 100 of FIG. 1, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example computing device 100 of FIG. 1 may include one or more elements, processes, and/or devices in addition to, or instead of, those illustrated in FIG. 2, and/or may include more than one of any or all of the illustrated elements, processes and devices.

A flowchart representative of example machine readable instructions, which may be executed to configure processor circuitry to implement the computing device 100 of FIG. 1, is shown in FIG. 2. The machine readable instructions may be one or more executable programs or portion(s) of an executable program for execution by processor circuitry, such as the processor circuitry 512 shown in the example processor platform 500 discussed below in connection with FIG. 5 and/or the example processor circuitry discussed below in connection with FIGS. 6 and/or 7. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 2, many other methods of implementing the example computing device 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 2 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 2 is a flowchart representative of example machine readable instructions and/or example operations 200 that may be executed and/or instantiated by processor circuitry to mitigate firmware malware. The machine readable instructions and/or the operations 200 of FIG. 2 begin at block 210, at which the example pre-boot authentication circuitry 120 (FIG. 1) is initialized. In some examples, the example hardware processor 160 (FIG. 1) may execute instructions to initialize the pre-boot authentication circuitry 120. In some examples, the instructions to initialize the example pre-boot authentication circuitry 120 are included in the example storage 110 or the example profile memory 125. In some examples, the pre-boot authentication circuitry 120 is initialized prior to user authentication on the example computing device 100 (e.g., before a user is allowed to log in). In some examples, initialization of the pre-boot authentication circuitry 120 begins upon powering up of the example computing device 100, but may alternatively begin after a restart of the example computing device 100, upon initialization of a virtual machine providing resources for the example computing device 100, etc.

The example malware detection circuitry 130 performs a malware scan of the example computing device 100. (Block 220). In the illustrated example of FIG. 2, the invocation of the malware detection circuitry 130 occurs after initialization of the example pre-boot authentication circuitry 120 and before user authentication. The example malware detection circuitry 130 performs a full-system scan or other malware detection scan to identify the presence of malware on the example computing device 100. For example, the example malware detection circuitry 130 scans at the firmware level on an example computing device 100 to detect firmware malware. In some examples, the computing system 100 is infected with or is including the presence of firmware malware prior to booting of the operating system of the example computing device 100. In some examples, the example malware detection circuitry 130 detects the presence of malware infecting the UEFI of an example computing device 100.

The example malware detection circuitry 130 determines whether there is malware detected on the example computing device 100. (Block 230). The determination may be based on the results of the scan (e.g., at block 220) or multiple scans completed by the example malware detection circuitry 130. In some examples, the malware detected on a system is firmware malware. For example, the firmware malware may include a rootkit. As used herein, a rootkit is computer software designed to access an example computing device 100 without the consent of a user of the example computing device 100. As used herein, a rootkit can take the form of firmware malware which can be detected by the example malware detection circuitry 130. Of course, the example malware detection circuitry 130 may detect other types of firmware malware.

In response to the example malware detection circuitry 130 detecting malware on the example computing device 100 (e.g., block 230 returning a result of YES), the pre-boot authentication circuitry 120 may interpret a setting, policy, and/or configuration to determine if remediation of the detected malware should be attempted. (Block 240). In some examples, the setting, policy, and/or configuration may be stored in the example storage 110 (FIG. 1) or the example profile memory 125 (FIG. 1) and accessed by the pre-boot authentication circuitry 120. In some examples, the pre-boot authentication circuitry 120 determines if remediation of the detected malware is to be attempted based on the type of malware detected, the scope of malware detected, etc.

In response to the example pre-boot authentication circuitry 120 determining that the malware is to be remediated (e.g., block 240 returning a result of YES), the example malware remediation circuitry 140 attempts remediation of malware on the example computing device 100. (Block 245). In some examples, the example malware remediation circuitry 140 may attempt to remediate malware by removing, quarantining, or otherwise disabling malware on the example computing device 100. In some examples, the malware remediation circuitry 140 modifies the firmware malware in a manner to make the firmware malware ineffective.

After attempting remediation, the example pre-boot authentication circuitry 120 determines whether the attempted remediation of the firmware malware by the example malware remediation circuitry 140 was successful. (Block 250). For example, the pre-boot authentication circuitry 120 may interpret results of the attempted remediation of the firmware malware and determine if the firmware malware has been removed, quarantined, disabled, or otherwise rendered ineffective. In response to the example malware remediation circuitry 140 successfully remediating the malware (e.g., block 250 returning a result of YES), the example pre-boot authentication circuitry 120 enables pre-boot authentication.

In response to the example malware remediation circuitry 140 successfully remediating the malware (e.g., block 250 returning a result of YES), the example hardware processor 160 executes instructions to perform user authentication. (Block 252). In some examples, user authentication may include causing display of a prompt requesting that a user enter a username, a password, provide a two-step verification code, etc. In some examples, the example display controller 170 may present the prompt to a user on an output device (e.g., a monitor, etc.) of the example computing device 100 requesting user credentials (e.g., a username, password, etc.). Upon the user entering credentials, the user credentials may be encrypted by the example cryptographic circuitry 150 and/or may be checked (e.g., authenticated) against user credentials stored at a remote location (e.g., a credential providing server), against a local registry key, against any other user credential manager, or at any other user credential storage location. If user authentication fails, the example process of FIG. 2 may be terminated (e.g., to prevent an unauthorized user from gaining access to the computer system).

In response to user authentication being completed successfully, disk decryption is enabled by the pre-boot authentication circuitry 120. (Block 254). Disk decryption is required for booting of an operating system of the example computing device 100. As used herein, disk decryption includes decrypting an operating system volume on-the-fly immediately after being read from the example storage 110 such that operating system files can be read and the operating system can be booted up. In some examples, the cryptographic circuitry 150 is responsible for decrypting an operating system volume on-the-fly after user authentication at block 252. For example, the cryptographic circuitry 150 may decrypt an operating system volume for the purpose of booting of an operating system of the example computing device 100 after pre-boot authentication circuitry 120 has changed a setting, policy, and/or configuration, etc. on the example computing device 100 to enable disk decryption.

In response to disk decryption being enabled, booting of the operating system is triggered by the decryption of a disk partition including instructions to bootup an operating system. (Block 256). In some examples, the decryption of a disk partition including instructions to bootup an operating system is completed by the example cryptographic circuitry 150.

Returning to block 230, in response to the example malware detection circuitry 130 determining there is no malware detected on the example computing device 100 (e.g., block 230 returning a result of NO), control proceeds to block 252, where the authentication procedure described above in connection with block 252 is performed.

In response to malware remediation not attempted by the example malware remediation circuitry 140 (e.g., block 240 returning a result of NO), or in response to malware remediation not successful (e.g., block 250 returning a result of NO), the example malware remediation circuitry 140 causes display of a prompt notifying a user of the vulnerability. (Block 260). In some examples, the prompt notifying the user of vulnerability is displayed via an output device associated with the example computing device 100 by the example display controller 170. In some examples, the prompt notifying the user of vulnerability includes textual or graphical messages. An example prompt for providing such a notification is described in connection with FIG. 3, below.

Subsequent to display of the prompt notifying the user of the vulnerability, the example malware remediation circuitry 140 determines whether to allow for a boot override. (Block 262). For example, a policy, setting, and/or other configuration of the example computing device 100 may allow or disallow a boot override. In such an example, the policy and/or configuration might indicate that a system is to be allowed to be booted, even in the presence of un-remediated malware.

In response to a determination that the boot override is allowed (e.g., block 262 returning a result of YES), the example display controller 170 causes display of a boot override prompt. (Block 264). The boot override prompt allows an operating system of the example computing system 100 to boot despite the detection of malware on the example computing device 100 that has not been mitigated. In some examples, the prompt may request entry of an override code. In some examples, the valid override code may be obtained from a computer security entity, an IT help desk, a system administrator, etc. The override code may include a series of characters, including, for example, numbers, letters, and/or other characters. In some examples, the override code may be based on a seed code provided via the boot override prompt that is to be provided to the IT help desk, system administrator, or other party that is to assist with overriding booting of the infected (and un-remediated) computer system. The IT help desk may generate the override code based on the seed code and provide the override code to the user for entry at the boot override prompt.

In response to a display of the boot override prompt, the malware remediation circuitry 140 may determine whether the override code is valid. (Block 270). In some examples, the example malware remediation circuitry may validate the override code by locally generating an internal override code from the seed code and determining whether the internal override code matches the code entered by the user. Of course, other approaches for validating a provided override code may additionally or alternatively be used.

In response to the determination that a valid override code has been entered (e.g., block 270 returning a result of YES), control proceeds to block 252, where user authentication and subsequent booting of the computer system occurs, as described above.

In response to the determination that the valid override code has not been entered (e.g., block 270 returning a result of NO), the example computing device 100 is prevented from booting. (Block 280). In some examples, the operating system of the example computing device 100 may be prevented from booting until the detected malware is removed from the system, or until a valid override code is provided to the example computing device 100.

Returning to block 262, in response to boot override not being allowed (e.g., block 262 returning a result of NO) control proceeds to block 280, where the example computing device 100 is prevented from booting. (Block 280).

Upon booting of the computer system (e.g., at block 256), or prevention of booting of the computer system (Block 280), the example process 200 of FIG. 2 is terminated. However, the example process 200 of FIG. 2 may be repeated upon a subsequent power-on event of the computer system or upon some other triggering event.

FIG. 3 is an example user interface 300 of a display informing a user that malware has been detected. More particularly, the example user interface 300 indicates that the system is locked because a virus has been detected in the firmware that could lead to data loss or theft. The example user interface 300 requests that the user contact their IT helpdesk for further assistance.

In some examples, the display 300 may include information (e.g., name, identification number, time detected, etc.)

and/or identifiers of the example computing system 100 (e.g., a hostname, etc.) regarding the nature of the detected virus. In some examples, the display 300 may include a phone number, email, or other contact information to provide instructions including a party to contact to seek assistance (e.g., an IT help desk, etc.). In some examples, the information and/or identifiers of the example computing system 100 may be used to facilitate this assistance. In some examples, the display 300 may have an override option after a user has taken the steps to gain further assistance and allow for the screen to be unlocked.

FIG. 4 is an example user interface 400 to present an option for a user to enter an override code. In some examples, entering the override code will, upon validation of the override code, allow a user to bootup the system. In some examples, this user interface 400 may not be presented. In some examples, to obtain the override code, the user must contact their IT helpdesk or other group may need to be to provide override instructions to allow the system to boot. Such an approach ensures that users do not unknowingly override booting while firmware malware is present without the knowledge of their IT department. In some examples, the user interface 400 may include a phone number, email, fax number, or other contact information in case the override code does not allow the system to bootup. In some examples, the user interface 400 may be presented before, after, or simultaneously presented with the example user interface of FIG. 3.

Figure 5:
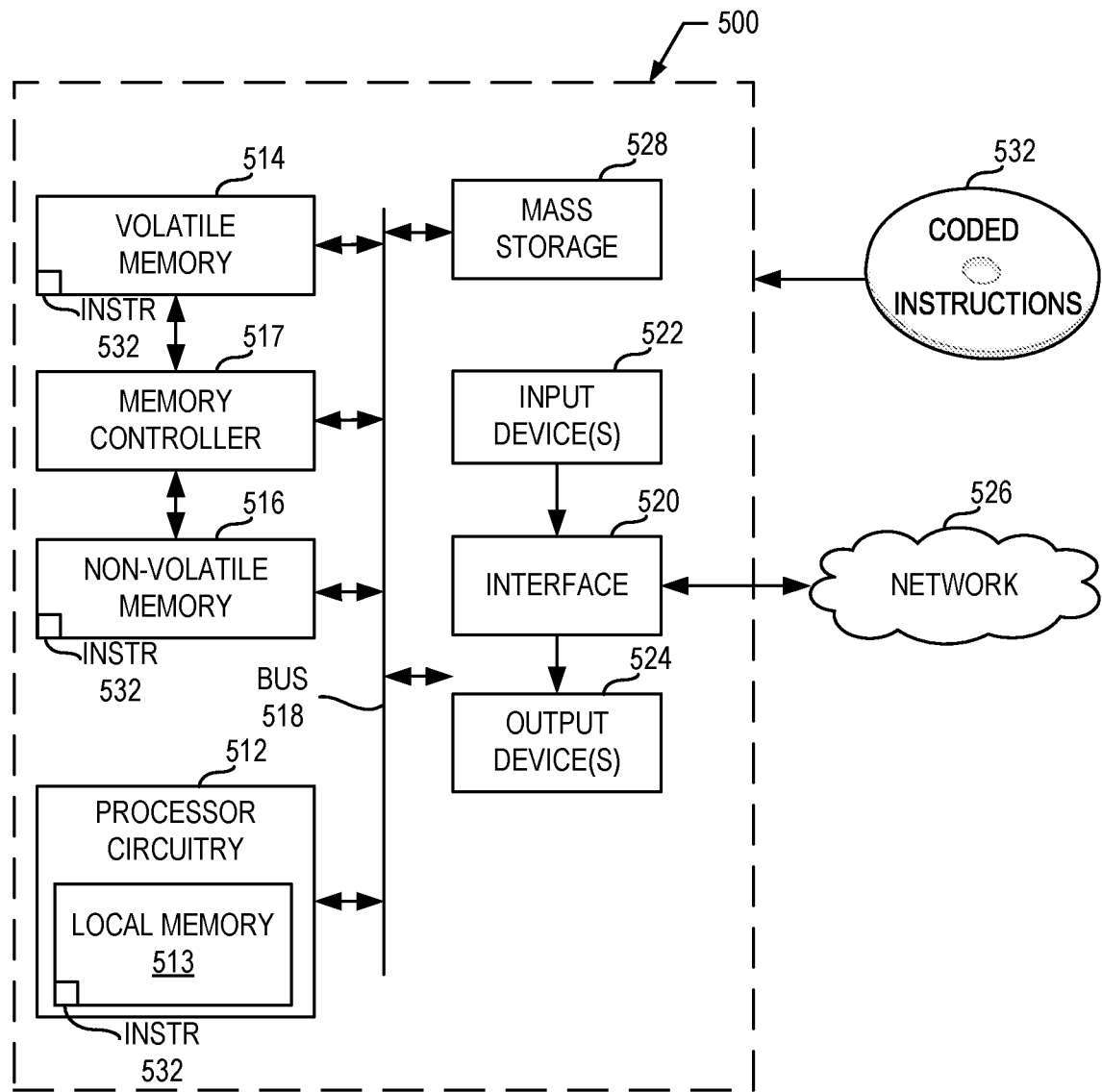
FIG. 5 is a block diagram of an example processor platform configured to execute the instructions of FIG. 2 to implement the example computing device of FIG. 1 to detect and mitigate firmware malware.

FIG. 5 is a block diagram of an example processor platform 500 structured to execute and/or instantiate the machine readable instructions and/or the operations of FIG. 2 to implement the example computing device 100 of FIG. 1. The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 500 of the illustrated example includes processor circuitry 512. The processor circuitry 512 of the illustrated example is hardware. For example, the processor circuitry 512 can be implemented by one or more integrated circuits, logic circuits, FPGAs, microprocessors, CPUs, GPUs, DSPs, and/or microcontrollers from any desired family or manufacturer. The processor circuitry 512 may be implemented by one or more semiconductor based (e.g., silicon based) devices. In this example, the processor circuitry 512 implements the example pre-boot authentication circuitry 120, the example malware detection circuitry 130, the example malware remediation circuitry 140, and the example cryptographic circuitry 150.

The processor circuitry 512 of the illustrated example includes a local memory 513 (e.g., a cache, registers, etc.). The processor circuitry 512 of the illustrated example is in communication with a main memory including a volatile memory 514 and a non-volatile memory 516 by a bus 518. The volatile memory 514 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 516 may be implemented by flash memory and/or any other desired type of memory device. Access to the main memory 514, 516 of the illustrated example is controlled by a memory controller 517.

The processor platform 500 of the illustrated example also includes interface circuitry 520. The interface circuitry 520 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 522 are connected to the interface circuitry 520. The input device(s) 522 permit(s) a user to enter data and/or commands into the processor circuitry 512. The input device(s) 522 can be implemented by, for example, an audio sensor, a microphone, a camera (still or video), a keyboard, a button, a mouse, a touchscreen, a track-pad, a trackball, an isopoint device, and/or a voice recognition system.

One or more output devices 524 are also connected to the interface circuitry 520 of the illustrated example. The output device(s) 524 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 520 of the illustrated example, thus, typically includes a graphics driver card, a graphics driver chip, and/or graphics processor circuitry such as a GPU.

The interface circuitry 520 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 526. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 500 of the illustrated example also includes one or more mass storage devices 528 to store software and/or data. Examples of such mass storage devices 528 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 532, which may be implemented by the machine readable instructions of FIG. 2, may be stored in the mass storage device 528, in the volatile memory 514, in the non-volatile memory 516, and/or on a removable non-transitory computer readable storage medium such as a CD or DVD.

Figure 6:
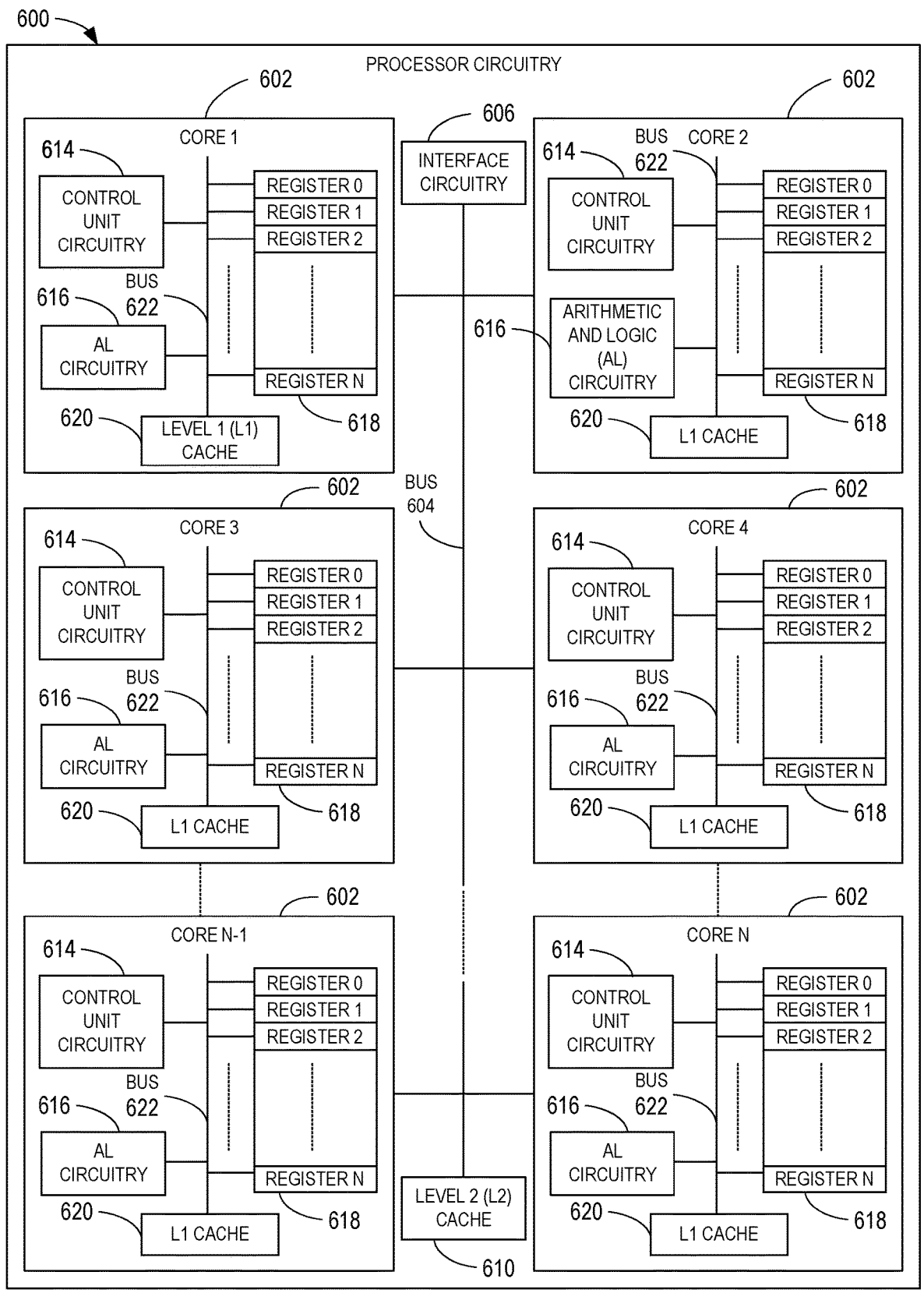
FIG. 6 is a block diagram of an example implementation of the processor circuitry of FIG. 5. Example processor circuitry is structured to execute the example computer readable instructions of FIG. 2 to implement the example computing device of FIG. 1.

FIG. 6 is a block diagram of an example implementation of the processor circuitry 512 of FIG. 5. In this example, the processor circuitry 512 of FIG. 5 is implemented by a microprocessor 600. For example, the microprocessor 600 may be a general purpose microprocessor (e.g., general purpose microprocessor circuitry). The microprocessor 600 executes some or all of the machine readable instructions of the flowchart of FIG. 2 to effectively instantiate the circuitry of FIG. 1 as logic circuits to perform the operations corresponding to those machine readable instructions. In some such examples, the circuitry of FIG. 1 is instantiated by the hardware circuits of the microprocessor 600 in combination with the instructions. For example, the microprocessor 600 may be implemented by multi-core hardware circuitry such as a CPU, a DSP, a GPU, an XPU, etc. Although it may include any number of example cores 602 (e.g., 1 core), the microprocessor 600 of this example is a multi-core semiconductor device including N cores. The cores 602 of the microprocessor 600 may operate independently or may cooperate to execute machine readable instructions. For example, machine code corresponding to a firmware program, an embedded software program, or a software program may be executed by one of the cores 602 or may be executed by multiple ones of the cores 602 at the same or different times. In some examples, the machine code corresponding to the firmware program, the embedded software program, or the software program is split into threads and executed in parallel by two or more of the cores 602. The software program may correspond to a portion or all of the machine readable instructions and/or operations represented by the flowchart of FIG. 2.

The cores 602 may communicate by a first example bus 604. In some examples, the first bus 604 may be implemented by a communication bus to effectuate communication associated with one(s) of the cores 602. For example, the first bus 604 may be implemented by at least one of an Inter-Integrated Circuit (I2C) bus, a Serial Peripheral Interface (SPI) bus, a PCI bus, or a PCIe bus. Additionally or alternatively, the first bus 604 may be implemented by any other type of computing or electrical bus. The cores 602 may obtain data, instructions, and/or signals from one or more external devices by example interface circuitry 606. The cores 602 may output data, instructions, and/or signals to the one or more external devices by the interface circuitry 606. Although the cores 602 of this example include example local memory 620 (e.g., Level 1 (L1) cache that may be split into an L1 data cache and an L1 instruction cache), the microprocessor 600 also includes example shared memory 610 that may be shared by the cores (e.g., Level 2 (L2 cache)) for high-speed access to data and/or instructions. Data and/or instructions may be transferred (e.g., shared) by writing to and/or reading from the shared memory 610. The local memory 620 of each of the cores 602 and the shared memory 610 may be part of a hierarchy of storage devices including multiple levels of cache memory and the main memory (e.g., the main memory 514, 516 of FIG. 5). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 602 may be referred to as a CPU, DSP, GPU, etc., or any other type of hardware circuitry. Each core 602 includes control unit circuitry 614, arithmetic and logic (AL) circuitry (sometimes referred to as an ALU) 616, a plurality of registers 618, the local memory 620, and a second example bus 622. Other structures may be present. For example, each core 602 may include vector unit circuitry, single instruction multiple data (SIMD) unit circuitry, load/store unit (LSU) circuitry, branch/jump unit circuitry, floating-point unit (FPU) circuitry, etc. The control unit circuitry 614 includes semiconductor-based circuits structured to control (e.g., coordinate) data movement within the corresponding core 602. The AL circuitry 616 includes semiconductor-based circuits structured to perform one or more mathematic and/or logic operations on the data within the corresponding core 602. The AL circuitry 616 of some examples performs integer based operations. In other examples, the AL circuitry 616 also performs floating point operations. In yet other examples, the AL circuitry 616 may include first AL circuitry that performs integer based operations and second AL circuitry that performs floating point operations. In some examples, the AL circuitry 616 may be referred to as an Arithmetic Logic Unit (ALU). The registers 618 are semiconductor-based structures to store data and/or instructions such as results of one or more of the operations performed by the AL circuitry 616 of the corresponding core 602. For example, the registers 618 may include vector register(s), SIMD register(s), general purpose register(s), flag register(s), segment register(s), machine specific register(s), instruction pointer register(s), control register(s), debug register(s), memory management register(s), machine check register(s), etc. The registers 618 may be arranged in a bank as shown in FIG. 6. Alternatively, the registers 618 may be organized in any other arrangement, format, or structure including distributed throughout the core 602 to shorten access time. The second bus 622 may be implemented by at least one of an I2C bus, a SPI bus, a PCI bus, or a PCIe bus Each core 602 and/or, more generally, the microprocessor 600 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 600 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 7:
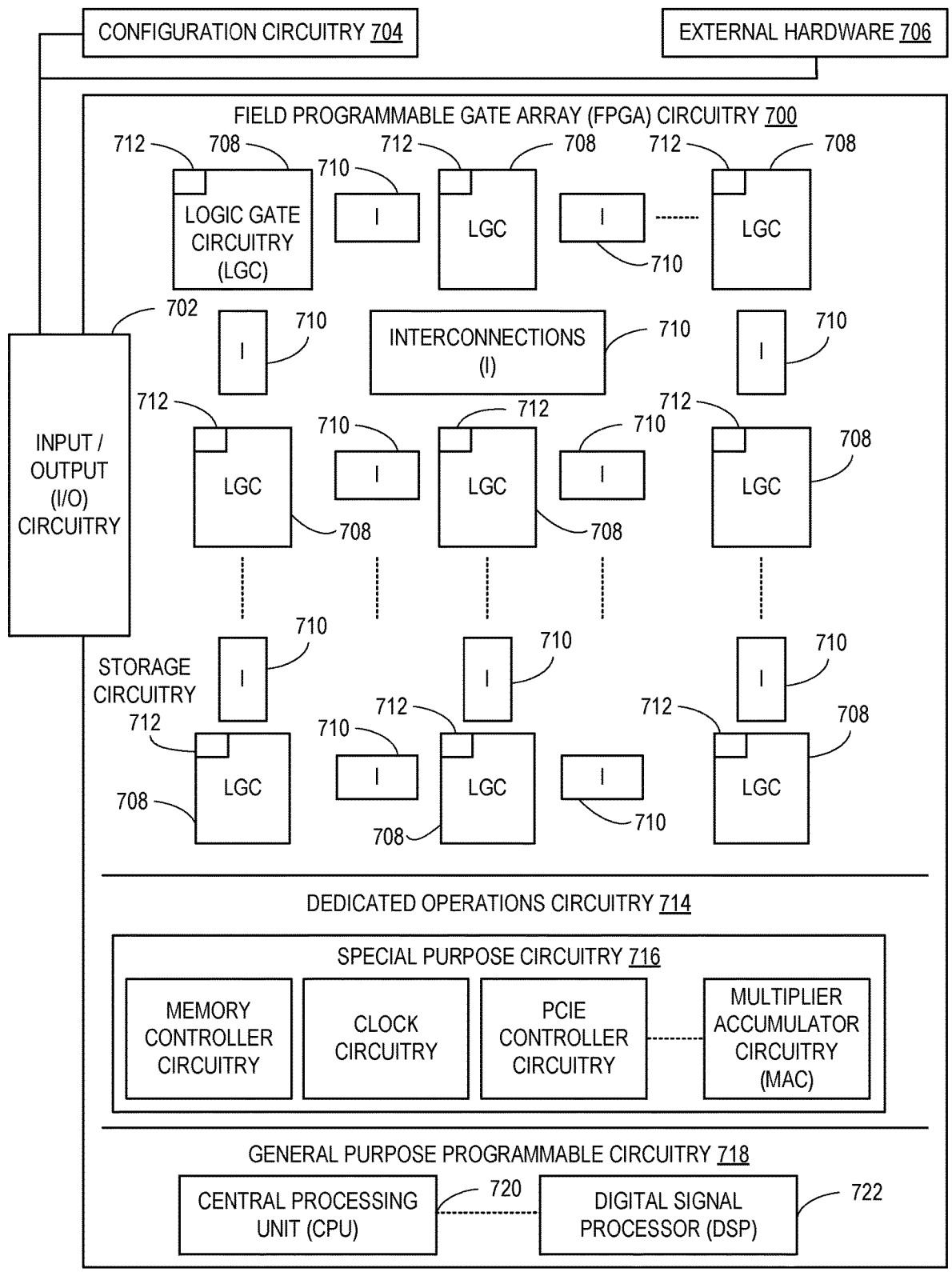
FIG. 7 is a block diagram of another example implementation of the processor circuitry of FIG. 5. In this example, example field programmable gate array (FPGA) circuitry is structured to execute the example computer readable instructions of FIG. 2 to implement the example computing device of FIG. 1.

FIG. 7 is a block diagram of another example implementation of the processor circuitry 512 of FIG. 5. In this example, the processor circuitry 512 is implemented by FPGA circuitry 700. For example, the FPGA circuitry 700 may be implemented by an FPGA. The FPGA circuitry 700 can be used, for example, to perform operations that could otherwise be performed by the example microprocessor 500 of FIG. 5 executing corresponding machine readable instructions. However, once configured, the FPGA circuitry 700 instantiates the machine readable instructions in hardware and, thus, can often execute the operations faster than they could be performed by a general purpose microprocessor executing the corresponding software.

More specifically, in contrast to the microprocessor 500 of FIG. 5 described above (which is a general purpose device that may be programmed to execute some or all of the machine readable instructions represented by the flowchart of FIG. 2 but whose interconnections and logic circuitry are fixed once fabricated), the FPGA circuitry 700 of the example of FIG. 7 includes interconnections and logic circuitry that may be configured and/or interconnected in different ways after fabrication to instantiate, for example, some or all of the machine readable instructions represented by the flowchart of FIG. 2. In particular, the FPGA circuitry 700 may be thought of as an array of logic gates, interconnections, and switches. The switches can be programmed to change how the logic gates are interconnected by the interconnections, effectively forming one or more dedicated logic circuits (unless and until the FPGA circuitry 700 is reprogrammed). The configured logic circuits enable the logic gates to cooperate in different ways to perform different operations on data received by input circuitry. Those operations may correspond to some or all of the software represented by the flowchart of FIG. 2. As such, the FPGA circuitry 700 may be structured to effectively instantiate some or all of the machine readable instructions of the flowchart of FIG. 2 as dedicated logic circuits to perform the operations corresponding to those software instructions in a dedicated manner analogous to an ASIC. Therefore, the FPGA circuitry 700 may perform the operations corresponding to the some or all of the machine readable instructions of FIG. 2 faster than the general purpose microprocessor can execute the same.

In the example of FIG. 7, the FPGA circuitry 700 is structured to be programmed (and/or reprogrammed one or more times) by an end user by a hardware description language (HDL) such as Verilog. The FPGA circuitry 700 of FIG. 7, includes example input/output (I/O) circuitry 702 to obtain and/or output data to/from example configuration circuitry 704 and/or external hardware 706. For example, the configuration circuitry 704 may be implemented by interface circuitry that may obtain machine readable instructions to configure the FPGA circuitry 700, or portion(s) thereof. In some such examples, the configuration circuitry 704 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 706 may be implemented by external hardware circuitry. For example, the external hardware 706 may be implemented by the microprocessor 700 of FIG. 6. The FPGA circuitry 700 also includes an array of example logic gate circuitry 708, a plurality of example configurable interconnections 710, and example storage circuitry 712. The logic gate circuitry 708 and the configurable interconnections 710 are configurable to instantiate one or more operations that may correspond to at least some of the machine readable instructions of FIG. 2 and/or other desired operations. The logic gate circuitry 708 shown in FIG. 7 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 708 to enable configuration of the electrical structures and/or the logic gates to form circuits to perform desired operations. The logic gate circuitry 708 may include other electrical structures such as look-up tables (LUTs), registers (e.g., flip-flops or latches), multiplexers, etc.

The configurable interconnections 710 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 708 to program desired logic circuits.

The storage circuitry 712 of the illustrated example is structured to store result(s) of the one or more of the operations performed by corresponding logic gates. The storage circuitry 712 may be implemented by registers or the like. In the illustrated example, the storage circuitry 712 is distributed amongst the logic gate circuitry 708 to facilitate access and increase execution speed.

The example FPGA circuitry 700 of FIG. 7 also includes example Dedicated Operations Circuitry 714. In this example, the Dedicated Operations Circuitry 714 includes special purpose circuitry 716 that may be invoked to implement commonly used functions to avoid the need to program those functions in the field. Examples of such special purpose circuitry 716 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 700 may also include example general purpose programmable circuitry 718 such as an example CPU 720 and/or an example DSP 722. Other general purpose programmable circuitry 718 may additionally or alternatively be present such as a GPU, an XPU, etc., that can be programmed to perform other operations.

Although FIGS. 6 and 7 illustrate two example implementations of the processor circuitry 512 of FIG. 5, many other approaches are contemplated. For example, as mentioned above, modern FPGA circuitry may include an on-board CPU, such as one or more of the example CPU 720 of FIG. 7. Therefore, the processor circuitry 512 of FIG. 5 may additionally be implemented by combining the example microprocessor 600 of FIG. 6 and the example FPGA circuitry 700 of FIG. 7. In some such hybrid examples, a first portion of the machine readable instructions represented by the flowchart of FIG. 2 may be executed by one or more of the cores 602 of FIG. 6, a second portion of the machine readable instructions represented by the flowchart of FIG. 2 may be executed by the FPGA circuitry 700 of FIG. 7, and/or a third portion of the machine readable instructions represented by the flowchart of FIG. 2 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 512 of FIG. 5 may be in one or more packages. For example, the microprocessor 600 of FIG. 6 and/or the FPGA circuitry 700 of FIG. 7 may be in one or more packages. In some examples, an XPU may be implemented by the processor circuitry 512 of FIG. 5, which may be in one or more packages. For example, the XPU may include a CPU in one package, a DSP in another package, a GPU in yet another package, and an FPGA in still yet another package.

Figure 8:
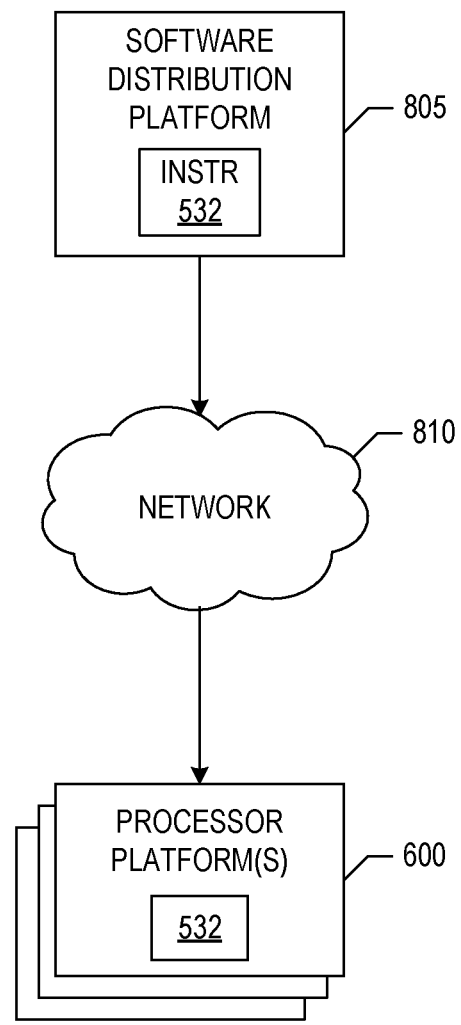
FIG. 8 is a block diagram of an example software distribution platform (e.g., one or more servers) to distribute software (e.g., software corresponding to the example machine readable instructions of FIG. 2) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 805 to distribute software such as the example machine readable instructions 532 of FIG. 5 to hardware devices owned and/or operated by third parties is illustrated in FIG. 8. The example software distribution platform 805 may be implemented by any computer server, data facility, cloud service, etc., capable of storing and transmitting software to other computing devices. The third parties may be customers of the entity owning and/or operating the software distribution platform 805. For example, the entity that owns and/or operates the software distribution platform 805 may be a developer, a seller, and/or a licensor of software such as the example machine readable instructions 532 of FIG. 5. The third parties may be consumers, users, retailers, OEMs, etc., who purchase and/or license the software for use and/or re-sale and/or sub-licensing. In the illustrated example, the software distribution platform 805 includes one or more servers and one or more storage devices. The storage devices store the machine readable instructions 532, which may correspond to the example machine readable instructions 200 of FIG. 2, as described above. The one or more servers of the example software distribution platform 805 are in communication with an example network 810, which may correspond to any one or more of the Internet and/or any of the example networks 102 and 526 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 832 from the software distribution platform 805. For example, the software, which may correspond to the example machine readable instructions 200 of FIG. 2, may be downloaded to the example processor platform 500, which is to execute the machine readable instructions 532 to implement the example machine readable instructions 200 of FIG. 2. In some examples, one or more servers of the software distribution platform 805 periodically offer, transmit, and/or force updates to the software (e.g., the example machine readable instructions 532 of FIG. 5) to ensure improvements, patches, updates, etc., are distributed and applied to the software at the end user devices.

From the foregoing, it will be appreciated that example systems, methods, apparatus, and articles of manufacture have been disclosed that mitigate firmware malware. Disclosed systems, methods, apparatus, and articles of manufacture improve the efficiency of using a computing device by detecting and mitigating firmware malware, including malware affecting the unified extendible firmware interface (UEFI). In some examples, disclosed systems, methods, apparatus, and articles of manufacture may reduce power required of a processor to detect and mitigate firmware malware. In some examples, disclosed systems, methods, apparatus, and articles of manufacture may reduce the time and/or resources required of a processor executing instructions to mitigate firmware malware. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to mitigate firmware malware are disclosed herein. Further examples and combinations thereof include the following:

Example 1 includes an apparatus to mitigate firmware malware, the apparatus comprising: at least one memory; instructions; and at least one processor to execute the instructions to cause the at least one processor to at least: detect presence of firmware malware, the firmware malware to be executed prior to booting of an operating system of a computing device; attempt remediation of the firmware malware; and in response to a failure to remediate the firmware malware, cause display of a notification of the presence of the firmware malware.

Example 2 includes the apparatus of example 1, wherein the at least one processor is to cause display of a prompt requesting a user credential, and to validate the user credential prior to disk decryption being enabled.

Example 3 includes the apparatus of example 2, wherein the at least one processor is to perform disk decryption before the booting of the operating system of the computing device can occur.

Example 4 includes the apparatus of example 1, wherein the at least one processor is to, in response to a failure to remediate the firmware malware, determine if a boot override is allowed.

Example 5 includes the apparatus of example 4, wherein the at least one processor is to, in response to the determination that the boot override is allowed, cause display of a boot override prompt.

Example 6 includes the apparatus of example 5, wherein the at least one processor is to cause display of a prompt that is to request a user credential upon input of a valid override code responsive to a boot override prompt.

Example 7 includes the apparatus of example 1, wherein the at least one processor is to, in response to remediating the firmware malware, cause display of a prompt that is to request a user credential.

Example 8 includes a non-transitory computer readable medium comprising instructions which, when executed, cause a processor to at least: detect presence of firmware malware, the firmware malware to be executed prior to booting of an operating system of a computing device; attempt remediation of the firmware malware; and in response to a failure to remediate the firmware malware, cause display of a notification of the presence of the firmware malware.

Example 9 includes the non-transitory computer readable medium of example 8, wherein the instructions, when executed, cause the processor to cause display of a prompt requesting a user credential, and validating the user credential prior to disk decryption is enabled.

Example 10 includes the non-transitory computer readable medium of example 9, wherein the instructions, when executed, cause the processor to perform disk decryption before the booting of the operating system of the computing device can occur.

Example 11 includes the non-transitory computer readable medium of example 8, wherein the instructions, when executed, cause the processor to, in response to a failure to remediate the firmware malware, determine if a boot override is allowed.

Example 12 includes the non-transitory computer readable medium of example 11, wherein the instructions, when executed, cause the processor to, in response to the determination that the boot override is allowed, cause display of a boot override prompt.

Example 13 includes the non-transitory computer readable medium of example 12, wherein the instructions, when executed, cause the processor to request a user credential upon input of a valid override code responsive to a boot override prompt.

Example 14 includes the non-transitory computer readable medium of example 8, wherein the instructions, when executed, cause the processor to, in response to remediating the firmware malware, cause display of a prompt that is to request a user credential.

Example 15 includes a method for firmware malware mitigation, the method comprising: detecting a presence of firmware malware, the firmware malware to be executed prior to booting of an operating system of a computing device; attempting remediation of the firmware malware; and in response to a failure to remediate the firmware malware, causing display of a notification of the presence of the firmware malware.

Example 16 includes the method of example 15, further including causing display of a prompt requesting a user credential before disk decryption is enabled.

Example 17 includes the method of example 16, further including performing disk decryption before the booting of the operating system of the computing device.

Example 18 includes the method of example 15, further including, in response to a failure to remediate the firmware malware, determining if a boot override is allowed.

Example 19 includes the method of example 18, further including, in response to the determination that the boot override is allowed, causing display of a boot override prompt.

Example 20 includes the method of example 19, further including causing display of a prompt that is to request a user credential.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference.

What is claimed is:

1. An apparatus to mitigate firmware malware, the apparatus comprising:
   at least one memory;
   instructions; and
   at least one processor to execute the instructions to cause the at least one processor to at least:
     detect presence of firmware malware, the firmware malware to be executed prior to booting of an operating system of a computing device;
     attempt remediation of the firmware malware;
     in response to a failure to remediate the firmware malware, cause display of a notification of the presence of the firmware malware;
     after display of the notification and before booting the operating system, display a first prompt to request a sequence of characters;
     generate an internal override code from a seed code; and
     after a determination that an entered sequence of characters matches the internal override code and before booting the operating system, cause display of a second prompt that is to request a user credential.

2. The apparatus of claim 1, wherein the at least one processor is to:
   cause display of the second prompt to request the user credential; and
   validate the user credential prior to enabling disk decryption.

3. The apparatus of claim 2, wherein the at least one processor is to enable the disk decryption before the booting of the operating system of the computing device.

4. The apparatus of claim 1, wherein the at least one processor is to, in response to the failure to remediate the firmware malware, determine if a boot override is allowed.

5. The apparatus of claim 1, wherein the at least one processor is to, in response to successfully remediating the firmware malware, cause display of a prompt that is to request a user credential.

6. The apparatus of claim 1, wherein the at least one processor is to boot the operating system after authenticating the user credential.

7. A non-transitory computer readable medium comprising instructions which, when executed, cause a processor to at least:
   detect presence of firmware malware, the firmware malware to be executed prior to booting of an operating system of a computing device;
   attempt remediation of the firmware malware;
   in response to a failure to remediate the firmware malware, cause display of a notification of the presence of the firmware malware;
   after display of the notification and before booting the operating system, display a first prompt to request a sequence of characters;
   generate an internal override code from a seed code; and
   after a determination that an entered sequence of characters matches the internal override code and before booting the operating system, display of a second prompt that is to request a user credential.

8. The non-transitory computer readable medium of claim 7, wherein the instructions, when executed, cause the processor to:
   cause display of the second prompt to request the user credential; and
   validate the user credential prior to enabling disk decryption.

9. The non-transitory computer readable medium of claim 8, wherein the instructions, when executed, cause the processor to enable the disk decryption before booting of the operating system of the computing device.

10. The non-transitory computer readable medium of claim 7, wherein the instructions, when executed, cause the processor to, in response to the failure to remediate the firmware malware, determine if a boot override is allowed.

11. The non-transitory computer readable medium of claim 7, wherein the instructions, when executed, cause the processor to, in response to successfully remediating the firmware malware, cause display of a prompt that is to request a user credential.

12. The non-transitory computer readable medium of claim 7, wherein the instructions, when executed, cause the processor to boot the operating system after authenticating the user credential.

13. A method for firmware malware mitigation, the method comprising:
   detecting a presence of firmware malware, the firmware malware to be executed prior to booting of an operating system of a computing device;
   attempting remediation of the firmware malware;
   in response to a failure to remediate the firmware malware, causing display of a notification of the presence of the firmware malware;
   after displaying the notification and before booting the operating system, displaying a first prompt to request a sequence of characters;
   generating an internal override code from a seed code; and
   after determining that an entered sequence of characters matches the internal override code and before booting the operating system, displaying a second prompt that is to request a user credential.

14. The method of claim 13, further including causing display of the second prompt to request the user credential before enabling disk decryption.

15. The method of claim 14, further including enabling the disk decryption before the booting of the operating system of the computing device.

16. The method of claim 13, further including, in response to the failure to remediate the firmware malware, determining if a boot override is allowed.

17. The method of claim 13, further including booting the operating system after authenticating the user credential.

* * * * *